(No Model.) 3 Sheets—Sheet 1.
E. ROBINSON.
APPARATUS FOR DRYING FISH AND OTHER ARTICLES.
No. 432,900. Patented July 22, 1890.
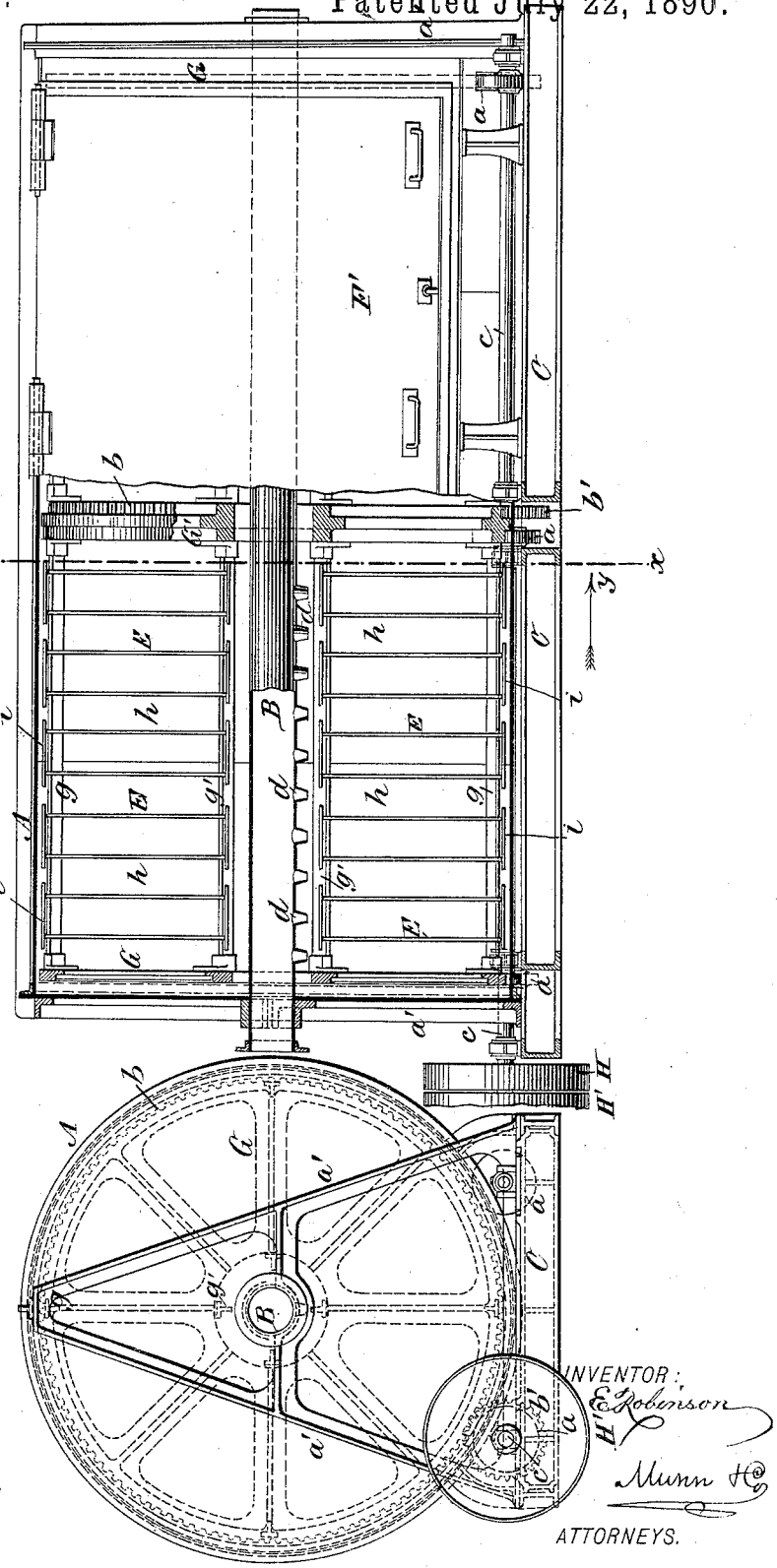

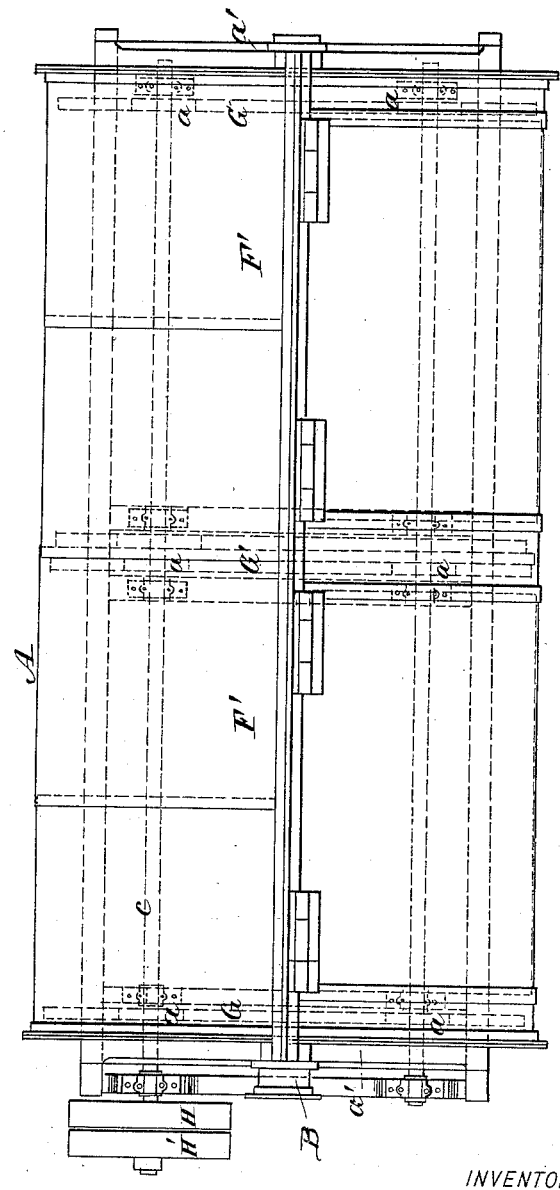

(No Model.) 3 Sheets—Sheet 3.
E. ROBINSON.
APPARATUS FOR DRYING FISH AND OTHER ARTICLES.
No. 432,900. Patented July 22, 1890.
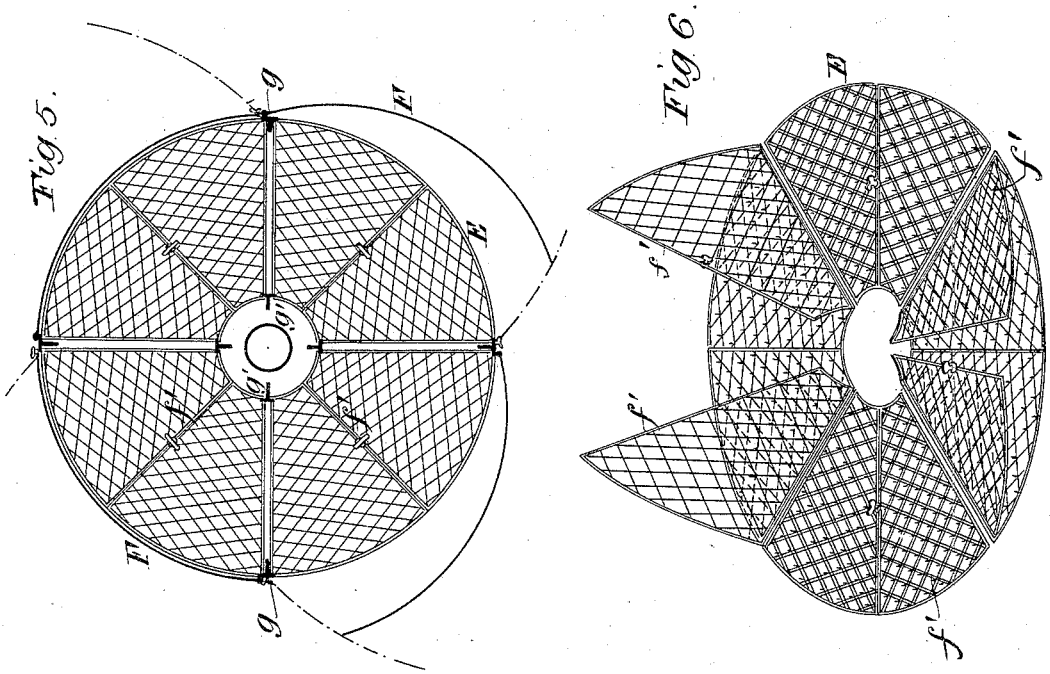
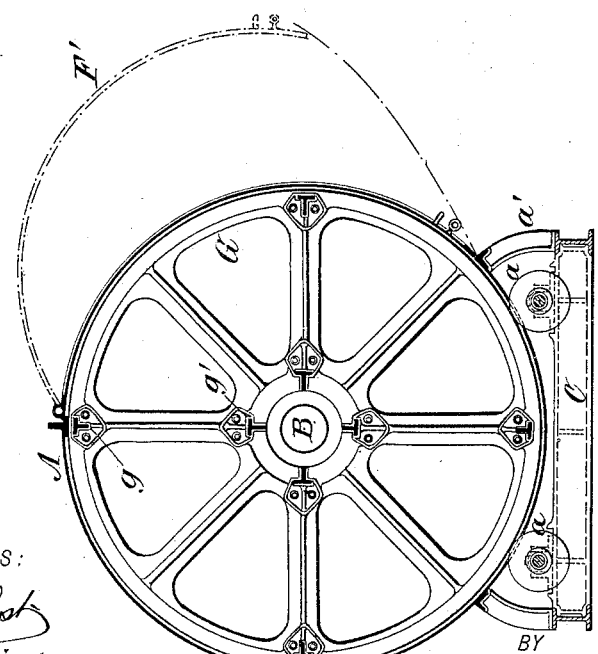
WITNESSES:
Paul Johst
C. Sedgwick
INVENTOR:
E. Robinson
BY
Munn & Co
ATTORNEYS.

UNITED STATES PATENT OFFICE.

EDWARD ROBINSON, OF ST. JOHNS, NEWFOUNDLAND.

APPARATUS FOR DRYING FISH AND OTHER ARTICLES.

SPECIFICATION forming part of Letters Patent No. 432,900, dated July 22, 1890.

Application filed October 2, 1889. Serial No. 325,770. (No model.) Patented in England June 25, 1886, No. 8,405; in France May 25, 1887, No. 183,785; in Newfoundland June 22, 1887, and in Canada January 13, 1888, No. 28,344.

*To all whom it may concern:*

Be it known that I, EDWARD ROBINSON, of St. Johns, Newfoundland, have invented a new and useful Improvement in Apparatus for Drying Fish and other Articles or Substances, (patented in England June 25, 1886, No. 8,405; in Canada January 13, 1888, No. 28,344; in France May 25, 1887, No. 183,785, and in Newfoundland June 22, 1887,) of which the following is a full, clear, and exact description.

My invention relates to apparatus for drying fish and other articles or substances, including tea, wool, fruit, and the like; but it will here be described more particularly with reference to the drying of fish.

The invention consists in a drying apparatus of novel construction, in which a blast of heated air is used in connection with revolving reticulated wire frames or baskets adapted to carry the material to be dried, substantially as hereinafter described, and more particularly pointed out in the claims.

Reference is to be had to the accompanying drawings, forming a part of this specification, in which similar letters of reference indicate corresponding parts in all the figures.

Figure 1 represents an end elevation of an apparatus embodying my invention, as adapted to the drying of fish for example. Fig. 2 is a partly broken and sectional longitudinal elevation of the same. Fig. 3 is a plan view thereof. Fig. 4 is a transverse section of the same upon the line $x$ $x$ in Fig. 2, looking in direction of the arrow $y$, certain skeleton frames or boxes used to hold the material to be dried being omitted. Fig. 5 is a further transverse section in part, mainly in illustration of said skeleton frames or boxes; and Fig. 6 is a view in perspective of one of the series of skeleton frames or boxes, or, as they may be termed, "wire frames" or "baskets," detached, showing the same both open and closed.

The fish or material to be dried is operated upon within a cylinder or cylinder-casing A, arranged to occupy a horizontal or nearly horizontal position, and which will here be described as stationary, and the appliances for carrying the fish or material within the cylinder as revolving.

B is a stationary central tube in the axial line of the cylinder A, suitably supported from a base C, as by a standard $a'$ at either end, that may also support or carry the cylinder A. Into this tube B heated air is forced by a pressure blower or fan. (Not shown in the drawings.) This tube is provided with a row of nozzles $d$ $d$, placed at suitable distances apart, arranged to project downward, so as to conduct the heated air forced into the tube into the interior of the cylinder for action on the material to be treated. Said nozzles are preferably of conical form, with the smaller end of the frustum at the external orifice; but they may be of any other suitable tapering form which will admit of the passage of the largest amount of air with comparatively little friction or resistance, a circular section not being indispensable; but in every case it is desirable that the external orifice of either nozzle is of smaller area than the body of the nozzle. This at least is the preferred construction of the nozzles.

The fish or material to be treated is contained within a series of reticulated wheels or wire disks E, arranged parallel with one another throughout the length of the cylinder. Each of these wire disks E is constructed to form a hollow wire-work box or basket, or by a suitable radial division a series of reticulated boxes or baskets, each occupying nearly one-fourth of the transverse area of the cylinder, and attached to longitudinal T-irons $g$ $g'$, extending the whole length of the cylinder, or thereabout, the reticulated baskets in sets of four, more or less, constituting a species of wheels E, any number of which are arranged at suitable distances apart throughout the length of the cylinder, and contain the fish, for instance, to be treated. Said wheels or disks E, each forming a series of reticulated boxes or baskets, are connected by the longitudinal T-irons $g$ $g'$ with circular open-work frames or heads G G', one being in the middle of the series of disks E and another at each end thereof, said frames or heads G G' and their connections $g$ $g'$ serving as a revolving frame or inner open cylinder carrying the cluster of baskets of which each disk E is composed. The nozzles 2 of the tube B are arranged to blow heated air between each pair of consecutive hollow disks E.

Doors F may be provided for the insertion and removal of the reticulated boxes or baskets, one being employed, say, for each reticulated box or basket of each disk E, as shown in Fig. 5, and each box or basket is provided with or constructed to form a lid $f'$, for the introduction and removal of the fish, the said lids being more clearly indicated in Fig. 6. This construction will apply when the cylinder A, instead of being stationary, is made to revolve and carry or rotate the series of basket-like disks having lids $f'$ along with it; but this is immaterial so long as the basket-like disks E are made to revolve in common with their frame or carrier, and the same means may be used to rotate the cylinder as are used to rotate the separately-rotating carrier of the reticulated hollow disks E, working within a stationary cylinder or outer casing A, which is the arrangement here shown. These rotating means are as follows: The frame composed of the circular heads or supports G G' and T-irons $g$ $g'$, and which serves as a carrier of the reticulated hollow disks or receptacles E, is arranged to rotate about or around the hot-air-distributing tube B, and may be supported on rollers $a$ $a$, applied beneath the circular heads or supports G G' or in any other suitable manner. Rotary motion is imparted to this frame or reticulated-hollow-disk carrier by any convenient arrangement of gearing. In the example illustrated said frame or carrier is provided on the periphery of its central circular support G' with spur-teeth $b$, which engage a pinion $b'$, fast on a shaft $c$, suitably supported in bearings on the base C, and the other extremity of which shaft carries fast and loose pulleys H H', for giving motion, as required, from a prime mover to said shaft and from thence to the frame or reticulated-hollow-disk carrier; but any other mode of driving said carrier may be adopted.

The heated air is forcibly discharged from the tube B through the nozzles $d$, preferably in a downward direction, into the spaces $h$, between the hollow reticulated disks E, while said disks are in motion, by means of the revolving frame which carries them, the air when it has become saturated with moisture derived from the fish or material being dried escaping out of the cylinder A—as, for instance, by openings in its ends—and being constantly replaced by fresh heated air as the operation proceeds. The cylinder or external casing A being stationary, two or any number of large doors F' may be conveniently used for insertion and withdrawal of the hollow reticulated disks or receptacles E, containing the fish. In Fig. 7 some of the wire boxes or baskets making up these receptacles are represented as open, in order to show the manner in which they may be filled or discharged. When in the machine, they may be kept in their places by bars $i$, arranged in sets to hold together separated series of the reticulated baskets or receptacles E, which connecting-bars may be secured to the outside of the irons $g$ of the revolving frame which carries the baskets by means of thumb-screws (not shown) or otherwise; but such basket-securing means form no part of my invention.

For the drying of tea the skeleton frames, boxes, or baskets comprised by the wheels or disks E require to be of a finer texture or mesh, and means—such, for example, as shelves—may be employed inside such frames or boxes for maintaining the tea in motion by carrying it up and then allowing it to fall in a thin stream exposed to the action of the heated air which traverses the sides of the skeleton frames or boxes; for the drying of wool the skeleton frames or boxes should usually be of larger capacity than when designed for drying fish; for the drying of fruit the skeleton frames or boxes may be provided inside with pockets or with small rods or pins to keep the fruit separate, and for drying other materials such modifications in detail will be made as will readily suggest themselves to those skilled in this particular art without further or special explanation.

Having thus described my invention, what I claim as new, and desire to secure by Letters Patent, is—

1. The combination, with a drying-casing, of a stationary central hot-air tube within the cylinder, and having downwardly-projecting discharge-nozzles at different points of its length, and a revolving frame within the cylinder and surrounding the hot-air tube, and provided with a series of reticulated baskets for the material to be dried, substantially as described.

2. The combination, with the stationary cylindrical casing A, of the stationary hot-air tube B, extending through the casing and having downwardly-projecting nozzles $d$, the revolving frame G G' $g$ $g'$ within the casing A, and the series of reticulated baskets E, each formed of a series of sections and secured in the said frame, substantially as described.

EDWARD ROBINSON.

Witnesses:
THOS. N. MOLLOY,
HUGH WHITE.